US012249916B2

(12) United States Patent
Kumar et al.

(10) Patent No.: US 12,249,916 B2
(45) Date of Patent: Mar. 11, 2025

(54) HYBRID DC-DC VARIABLE SWITCHED CAPACITOR CONVERTER AND METHOD OF OPERATION

(71) Applicant: SILICONCH SYSTEMS PVT LTD, Karnataka (IN)

(72) Inventors: Kaustubh Kumar, Uttar Pradesh (IN); Burle Naga Satyanarayana, Andhra Pradesh (IN); Rakesh Kumar Polasa, Karnataka (IN); Satish Anand Verkila, Karnataka (IN)

(73) Assignee: SILICONCH SYSTEMS PVT LTD, Karnataka (IN)

( * ) Notice: Subject to any disclaimer, the term of this patent is extended or adjusted under 35 U.S.C. 154(b) by 240 days.

(21) Appl. No.: 18/093,223

(22) Filed: Jan. 4, 2023

(65) Prior Publication Data

US 2023/0216413 A1 Jul. 6, 2023

(30) Foreign Application Priority Data

Jan. 4, 2022 (IN) .............................. 202241000300

(51) Int. Cl.
*H02M 3/158* (2006.01)
*H02M 1/00* (2006.01)
*H02M 1/14* (2006.01)

(52) U.S. Cl.
CPC ....... *H02M 3/1584* (2013.01); *H02M 1/0095* (2021.05); *H02M 1/143* (2013.01)

(58) Field of Classification Search
CPC ... H02M 3/1584; H02M 1/0095; H02M 1/143
See application file for complete search history.

(56) References Cited

U.S. PATENT DOCUMENTS 12,057,772 B2 * 8/2024 Mercer ................... H02M 3/07
2020/0326384 A1 * 10/2020 Ashourloo ............ H02M 3/155
(Continued)

FOREIGN PATENT DOCUMENTS

DE 102021133135 B3 * 12/2022 .............. H02M 3/07

OTHER PUBLICATIONS

Universal Serial Bus Type-C Cable and Connector Specification Release 2.0, USB 3.0 Promoter Group, Aug. 2019 (373 pages).
(Continued)

*Primary Examiner* — Adolf D Berhane
(74) *Attorney, Agent, or Firm* — Procopio, Cory, Hargreaves & Savitch LLP

(57) ABSTRACT

The present disclosure provides for a hybrid DC-DC, Hybrid Variable Switched Capacitor (HVSC) power converter. The converter may include one or more power switching networks supporting a plurality of power conversion modes and characterised in that: an input terminal connected to an input power source and an associated input capacitance, an output terminal connected to a load and an associated output capacitance to obtain a desired output voltage or output load current regulation; and at least six switches, one or more inductors and one or more flying capacitors. The converter addresses the problems faced by inductor-based and inductor-less DC-DC power converters while providing higher power conversion efficiencies alike the inductor-less switched capacitor converters and voltage/current regulation alike the inductor-based power converters in a single power conversion unit and enable a duty cycle-based output voltage/current regulation.

10 Claims, 5 Drawing Sheets

(56) References Cited

U.S. PATENT DOCUMENTS

| | | | |
|---|---|---|---|
| 2023/0179092 A1* | 6/2023 | Jin | H02M 1/0058 |
| | | | 323/272 |
| 2023/0344365 A1* | 10/2023 | Kumar | H02M 7/4837 |

OTHER PUBLICATIONS

Universal Serial Bus Power Delivery Specification, Revision 3.0, Version 2.0, Aug. 29, 2019 (657 pages).

* cited by examiner

HYBRID DC-DC VARIABLE SWITCHED CAPACITOR CONVERTER AND METHOD OF OPERATION

CROSS REFERENCE TO RELATED APPLICATION(S)

This application claims the benefit of and priority to India Application Serial No. 202241000300, entitled "A HYBRID DC-DC VARIABLE SWITCHED CAPACITOR CONVERTER AND METHOD OF OPERATION" and filed on Jan. 4, 2022, which is expressly incorporated by reference herein in its entirety.

TECHNICAL FIELD

The present disclosure relates to a Hybrid, DC-DC, Variable Switched Capacitor (HVSC) Converter. More particularly, it relates to a converter that addresses the problems faced by inductor-based and inductor-less DC-DC power converters while providing higher power conversion efficiencies over a wide range of input voltage levels, output load and output voltage regulation, alike the inductor-less switched capacitor converters and the inductor-based power converters in a single power conversion unit.

BACKGROUND

Background description includes information that can be useful in understanding the present invention. It is not an admission that any of the information provided herein is prior art or relevant to the presently claimed invention, or that any publication specifically or implicitly referenced is prior art.

Existing converters comprise of multiple non-isolated power converter topologies for step-down DC-DC power conversion, primarily targeted for portable device applications, such as battery charging, discharging, regulated power supply generation, etc. In broad terms, the commonly used step-down DC-DC power converter topologies are either inductor-based or inductor-less. The DC-DC power converter topology is chosen based on certain key factors such as system efficiency, input supply compatibility, mode of regulation, and system cost.

System efficiency is essentially the ratio of output power being delivered to the input power being drawn by the power converter. Efficiency numbers for practical step-down power converters not only depend on the power losses due to output load current draw or the input voltage-to-output voltage step-down ratio, but also on the arrangement of power converter switches (generally implemented as Power MOSFETs) and other passive components (such as inductors, capacitors, and the like). Generally, a power converter topology must be efficient for higher input voltage and higher output load current, to reduce DC transmission losses over power cable with higher voltage and lesser current. In present day portable systems, the most used step-down DC-DC power converter topology is inductor-based synchronous buck converter, which suffers from higher losses, i.e., lower efficiency, as load current or input voltage increases. The inductor carries the entire load current, resulting in huge conduction loss across the coil DCR (DC Resistance). The switching losses in the power MOSFETs while turning on/turning off and MOSFETs' off-state voltage stress also increase with higher input voltage and higher load current. Other inductor-based topologies improve on the losses such as 3-level buck converter which reduces the off-state voltage stress on the power MOSFETs, or the quasi-resonant buck converter which reduces the switching losses in the power MOSFETs to almost zero, but all these still suffer with high inductor coil DCR conduction loss. Inductor-less topologies such as switched capacitor converters reduce the conduction loss by utilizing non-common switching phases with the help of a flying capacitor. Switched capacitor converters also have lower switching losses as the absence of inductor does not mandate a continuous current flow while the power MOSFETs are turning on or turning off.

Input supply compatibility, which the power converter topology should ensure. In case, a single power converter topology cannot support the entire variety of input power supplies, multiple parallel power converter topologies must be deployed which have to be in operation dynamically based on the input power supply. Inductor-based power converter topologies such as buck/boost, 3-level buck/boost, etc. can provide a constant output voltage for any input voltage level, by performing duty cycle-based switching operation. On the other hand, switched capacitor converters can only work with an input voltage level which is in a fixed integral ratio with desired output voltage level. Hence, a switched capacitor converter cannot provide a variable duty cycle regulation.

Mode of regulation, where a power converter may be desired to work in any of the constant output current regulation mode, constant output voltage mode, etc. Inductor-based DC-DC power converters can provide all standard modes of regulations, whereas inductor-less switched capacitor converters, though having higher efficiency, operate in open-loop and work at a fixed operating point and provide no voltage or current regulation.

System cost which includes the cost of implementation of the power converter with discrete hardware components, or an integrated circuit (IC), or a mix of both. Present day portable device systems often incorporate both the inductor-based and inductor-less power converters as two separate standalone units, to achieve both high-efficiency open-loop conversion for high output power levels, but at a fixed input voltage, as well as duty cycle-based voltage/current regulation for lower output power levels, but compatible with any input voltage. This increases the overall cost and PCB footprint of the power conversion system.

Therefore, there is a need in the art to provide a reliable and efficient DC-DC Hybrid Variable Switched Capacitor Converter (HVSC) that addresses the problems faced by inductor-based and inductor-less DC-DC power converters, by providing a higher power conversion efficiency like the inductor-less switched capacitor converters, and voltage/current regulation like the inductor-based power converters in a single power conversion unit.

OBJECTS OF THE PRESENT DISCLOSURE

It is an object of the present invention to provide for a DC-DC Hybrid Variable Switched Capacitor Converter (HVSC) that provides a higher power conversion efficiency like the inductor-less switched capacitor converters, and voltage/current regulation like the inductor-based power converters in a single power conversion unit.

It is an object of the present invention to provide for a DC-DC HVSC converter uses inductor as well as flying capacitor in the switching topology, enabling a duty cycle-based output voltage/current regulation.

It is an object of the present invention to provide for a DC-DC HVSC converter that enables power conversion with a switching scheme that does not lead to entire load current flowing through the inductor, hence providing higher efficiency.

It is an object of the present invention to provide for a DC-DC HVSC converter that enables lower switching losses at higher input voltages to improve the efficiency compared to standard inductor-based converters.

It is an object of the present invention to provide for a DC-DC HVSC converter HVSC converter that is optimized to work with greater efficiency at higher input voltages for the same output voltage and higher output load current, the desired DC-DC conversion for fast charging. In case duty cycle more than 50% is desired, the HVSC can work as a standard inductor-based buck converter as well.

It is an object of the present invention to provide for a DC-DC HVSC converter that contributes a very small drop in efficiency, by adding the voltage/current regulation feature which is not feasible with open-loop switched capacitor converters.

It is an object of the present invention to provide for a DC-DC HVSC converter that supports the open-loop standard 2:1 switched capacitor converter, thus not losing behind the high 2:1 direct conversion efficiency of switched capacitor conversion.

It is an object of the present invention to provide for a DC-DC HVSC converter that can present as standalone units in present day portable device systems, HVSC converter provides a single power conversion unit, while enabling the desired higher efficiency and voltage/current regulation features.

It is an object of the present invention to provide for a DC-DC HVSC converter that reduces the overall cost and PCB footprint of the power conversion system.

SUMMARY

The present disclosure relates to a power converter, and, in particular embodiments, Various objects, features, aspects, and advantages of the inventive subject matter will become more apparent from the following detailed description of preferred embodiments, along with the accompanying drawing figures in which like numerals represent like components.

In an aspect, the present disclosure provides a hybrid variable switched capacitor DC-DC power converter. The converter may include one or more power switching networks supporting a plurality of power conversion modes and characterised in that: an input terminal connected to an input power source and an associated input capacitance, an output terminal connected to a load and an associated output capacitance to obtain a desired output voltage or output load current regulation; and at least six switches, one or more inductors and one or more flying capacitors.

In an embodiment, the one or more switching networks may include a first, a second, a third and a fourth switch of the at least six switches, wherein the first, the second, the third and the fourth switch may be connected in series between the input terminal and the ground; a fifth switch configured in the switching network such that a first terminal of the fifth switch is connected to a shared node of the first and the second switch and a second terminal of the fifth switch is connected to a sixth switch.

In an embodiment, the one or more switching networks further may include the sixth switch configured in the switching network such that a first terminal of the sixth switch is connected to the fifth switch and a second terminal of the sixth switch is connected to the ground; the inductor connected between a shared node of the fifth and the sixth switch and the output terminal; the one or more flying capacitors connected between a shared node of the first and the second switch and the shared node of the third and fourth switch.

In an embodiment, the plurality of power conversion modes may include any of a Variable Switched Capacitor (VSC) Mode, Halving Switched Capacitor (HSC) Mode, Synchronous Buck Mode, Direct Connection Mode. The converter may be operated in the any of a switching or non-switching mode to obtain a set of step-down power conversion schemes. Each power conversion scheme may be selected for a predefined range of step-down ratios to maximize efficiency of the power conversion, and wherein each power conversion scheme is selected at a time based on the load type and input power source type.

In an embodiment, a first switching network for enabling the VSC Mode for power conversion is configured for a desired output voltage that is less than half of the input voltage level, wherein the VSC comprises at least two phases.

In an embodiment, the at least two phases may include a first switching phase for a first predefined time duration T1. The first switch and the third switch of the first switching network may be turned on to charge the flying capacitor in series with the output load from the input power source and the sixth switch of the first switching network may be turned on to allow the inductor to transfer the stored energy to the load.

In an embodiment, the at least two phases may include a second switching phase for a second predefined time duration T2. The first switching network may include the fourth and the fifth switches may be turned on to transfer the energy stored in the flying capacitor in the first switching phase to be transferred to the inductor and the load.

In an embodiment, a second switching network for enabling the HSC Mode for power conversion may be configured for the desired output voltage to be equal to half of the input voltage level and an output current is approximately double of an input current.

In an embodiment, a third switching network for enabling the Synchronous Buck Mode power conversion may be configured for a desired output voltage that is greater than half of the input voltage level.

In an embodiment, a fourth switching network for enabling the Direct Connection Mode power conversion may be configured for a desired output voltage that is equal to the input voltage level, wherein the output current is equal to the input current.

In an aspect, the present disclosure provides a method of operation of the converter the Variable Switched Capacitor mode. The method may include the step of operating the converter in at least two switching phases, and total time of the at least two switching phases can be equal to the switching time-period. In the first switching phase, the first and the third switches can be turned on to charge the flying capacitor in series with the output load from the input power source and the sixth switch can be turned on to allow the inductor to transfer a stored energy in the inductor to the load. In the second switching phase, the fourth and the fifth switches can be turned on to transfer a stored energy in the flying capacitor to the inductor and the load. A small dead time may be introduced between the at least two switching phases between turning off a first set of switches and turning on of a second set of switches, and the second switch may be turned off for the entire operation. A ratio of desired output voltage to the input voltage may be represented as a ratio of the second switching phase time to a sum of total switching time and the second switching phase time.

In an aspect, the present disclosure provides a method of operation of the converter working in in the Half-Switched Capacitor mode. The method may include the step of operating the converter in at least two switching phases, the total time of the two switching phases being equal to the switching time-period. In the first switching phase, the first and the third switches may be turned on to charge the flying capacitor in series with the load, and, in the second switching phase, the second and the fourth switches are turned on to transfer the stored energy in the flying capacitor to the load. A small dead time may be introduced between the two switching phases between turning off a third set of switches and turning on of a fourth set of switches. The fifth and the sixth switches may be turned off for the entire operation, and wherein the desired output voltage may be half of the input voltage.

In an aspect, the present disclosure provides a method of operation of the converter working in the in Synchronous Buck mode. The method may include the step of operating the converter in at least two switching phases, the total time of the two switching phases equal to the switching time-period. The first switch may be turned on for the entire operation. In the first switching phase, the fifth switch may be turned on to charge the inductor in series with the load, and in the second switching phase, the sixth switch is turned on to transfer the stored energy in the inductor to the load. A small dead time is introduced between the at least two switching phases between turning off a fifth set of switches and turning on of a sixth set of switches, where the second, the third and the fourth switches may be turned off for the entire operation, and the ratio of desired output voltage to the input voltage is represented as the ratio of the first switching phase time to the total switching time.

In an aspect, the present disclosure provides a method of operation of the converter working in the Direct Connection mode. The method may include the steps of turning on the first and the second switches for the entire operation to directly connect the input power source to the load; and turning off the third, the fourth, the fifth and the sixth switches for the entire operation, wherein the desired output voltage is same as the input voltage.

BRIEF DESCRIPTION OF THE DRAWINGS

The accompanying drawings are included to provide a further understanding of the present invention and are incorporated in and constitute a part of this specification. The drawings illustrate exemplary embodiments of the present invention and, together with the description, serve to explain the principles of the present invention.

DETAILED DESCRIPTION

The present disclosure relates to a power converter, and, in particular embodiments, to a bi-directional hybrid variable switched capacitor power converter for step-down power conversion operations and the like.

The present disclosure relates to a Hybrid, DC-DC, Variable, Switched Capacitor (HVSC) Converter. More particularly, it relates to a converter that addresses the problems faced by inductor-based and inductor-less DC-DC power converters while providing higher power conversion efficiencies alike the inductor-less switched capacitor converters and voltage/current regulation alike the inductor-based power converters in a single power conversion unit. The proposed converter incorporates one or more inductors and flying capacitor to enable a duty cycle-based output voltage/current regulation.

Figure 1:
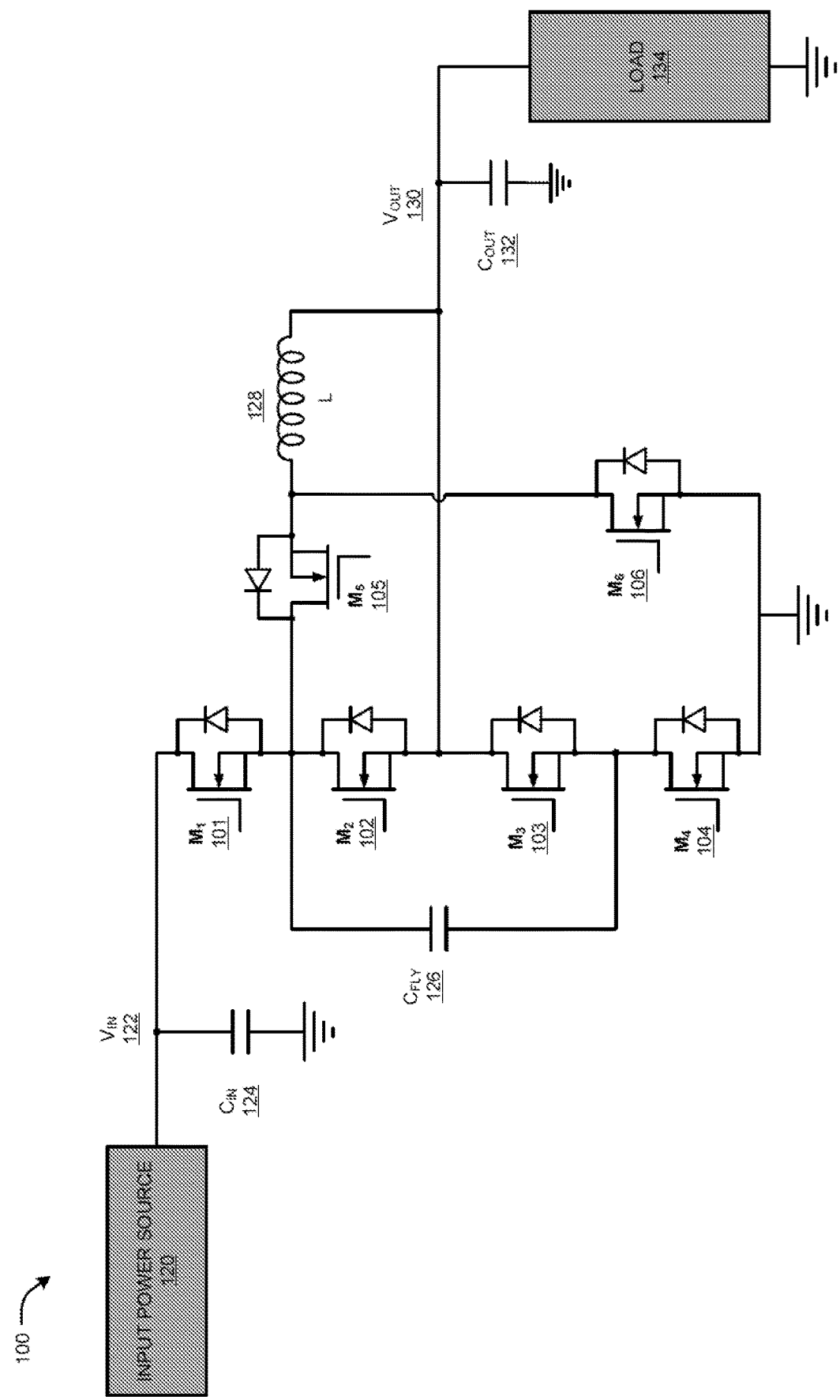
FIG. 1 illustrates an exemplary schematic diagram of the proposed hybrid power converter, in accordance with an embodiment of the present disclosure.

FIG. 1 illustrates an exemplary schematic diagram of the proposed hybrid power converter, in accordance with an embodiment of the present disclosure.

As illustrated, in an aspect a hybrid power converter 100 (also referred to as a DC-DC Hybrid Variable Switched Capacitor Converter 100 (HVSC 100)) is provided that may include an input circuit that may include an input power supply (120), one or more input capacitors (124), and plurality of switches (101-106) (interchangeably referred to as M1, M2 ... M6 respectively herein) connected across the input power supply (120).

In an embodiment, the switches can be physically implemented as power MOSFETs. The output circuit consists of an output terminal connected to a load (134) and an associated output capacitance (132). The power converter network comprises an inductor (128) and one or more flying capacitors (CFLY) (126).

In an embodiment, a first (101), a second (102), a third (103) and a fourth switch (104) may be connected in series between the input terminal and the ground. A fifth switch (105) may be configured in the switching network such that a first terminal of the fifth switch (105) is connected to a shared node of the first switch (101) and the second switch (102) and a second terminal of the fifth switch (105) is connected to a sixth switch (106). The sixth switch (106) may be configured such that a first terminal of the sixth switch (106) may be connected to the fifth switch (105) and a second terminal of the sixth switch (106) may be connected to the ground.

In an embodiment, the inductor may be connected between the shared node of the fifth switch (105) and sixth switch (106) and the output terminal, and the one or more flying capacitors (126) may be connected between the shared node of the first switch (101) and the second switch (102) and the shared node of the third (103) and the fourth switch (104).

In an aspect, the HVSC converter may support at least four power conversion modes such as a Variable Switched Capacitor (VSC) Mode, 2:1 Halving Switched Capacitor (HSC) Mode, Synchronous Buck Mode, Direct Connection Mode and the like. The VSC mode may further include at least two phases such as a Switching Phase 1 for first predefined time duration T1, a Switching Phase 2 for a second predefined time duration T2 and the like.

Figure 2:
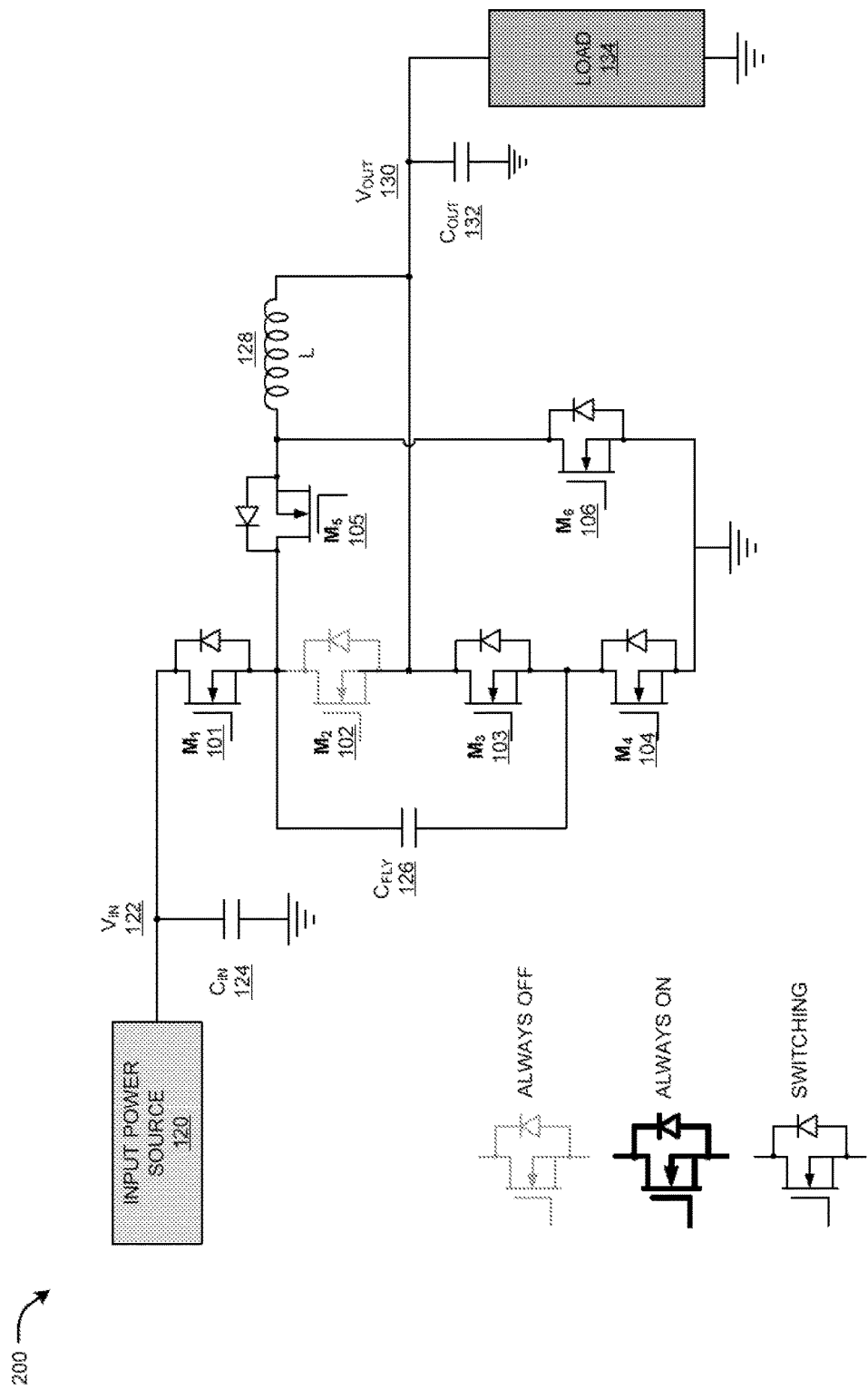
FIG. 2 illustrates an exemplary schematic diagram of the proposed hybrid power converter in a Variable Switched Capacitor (VSC) Mode, in accordance with an embodiment of the present disclosure.

FIG. 2 illustrates an exemplary schematic diagram of the proposed hybrid power converter in Variable Switched Capacitor (VSC) Mode, in accordance with an embodiment of the present disclosure. As illustrated, the power converter operation in VSC mode may require the switches 101, 103, 104, 105, and 106 to be switching between ON and OFF states across the two switching phases and the switch 102 to be always off.

In an embodiment, in the Variable Switched Capacitor (VSC) Mode for power conversion, the desired output voltage is less than half of the input voltage level (VOUT<½ VIN, or, in other words, a duty cycle of <50%). The VSC mode may be composed of at least two phases: a first Switching Phase (interchangeably referred to as the Switching Phase 1) for the first predefined time duration T1 where the switches 101 and 103 may be turned on to charge flying capacitor $C_{FLY}$ (126) in series with the output load and switch 106 may also be turned on to allow inductor to transfer the stored energy to the load. Below equations represent the state of the flying capacitor $C_{FLY}$ (126) and the inductor L (128) during switching cycle 1:

$$VIN-VFLY=VOUT; 0-VOUT=L\Delta I1/T1$$

In an embodiment, in the second Switching Phase (interchangeably referred to as the Switching Phase 2) for the second predefined time duration T2 may include the switches 104 and 105 to be turned on to transfer the energy stored in flying capacitor $C_{FLY}$ (126) in phase 1 to the inductor and the load. Below equations represent the state of the flying capacitor $C_{FLY}$ and the inductor L during switching phase 2:

$$VFLY-VOUT=L\Delta I2/T2.$$

Assume T1+T2=T, the total switching time-period of both the switching phases. The decrease in inductor current $-\Delta I1$ in switching phase 1 should be the same as increase in inductor current $-\Delta I2$ in switching phase 2, hence:

$$-\Delta I1=\Delta I2, VOUT\times T1/L=(VFLY-VOUT)\times T2/L,$$

Substituting VFLY=VIN-VOUT from the equation for switching phase 1, $$VOUT\times T1=(VIN-2\times VOUT)\times T2,$$

$$VOUT=VIN\times T2/(T1+2T2),$$

$$VOUT=VIN/(2+T1/T2)=VIN\times D$$

In an embodiment, the switching cycles times T1 and T2 may be adjusted to obtain the various values for the ratio T1/T2 as per the VOUT voltage equation above, hence obtaining the various levels of output voltage $V_{OUT}$ (130). It can be noted that since the denominator 2+T1/T2 is always greater than 2, for any given input voltage $V_{IN}$ (122), an output voltage $V_{OUT}$ (130) less than $V_{IN}/2$ can only be obtained, effectively giving a duty cycle, D, less than 50% for all values of the switching phase time durations, T1 and T2.

Figure 3:
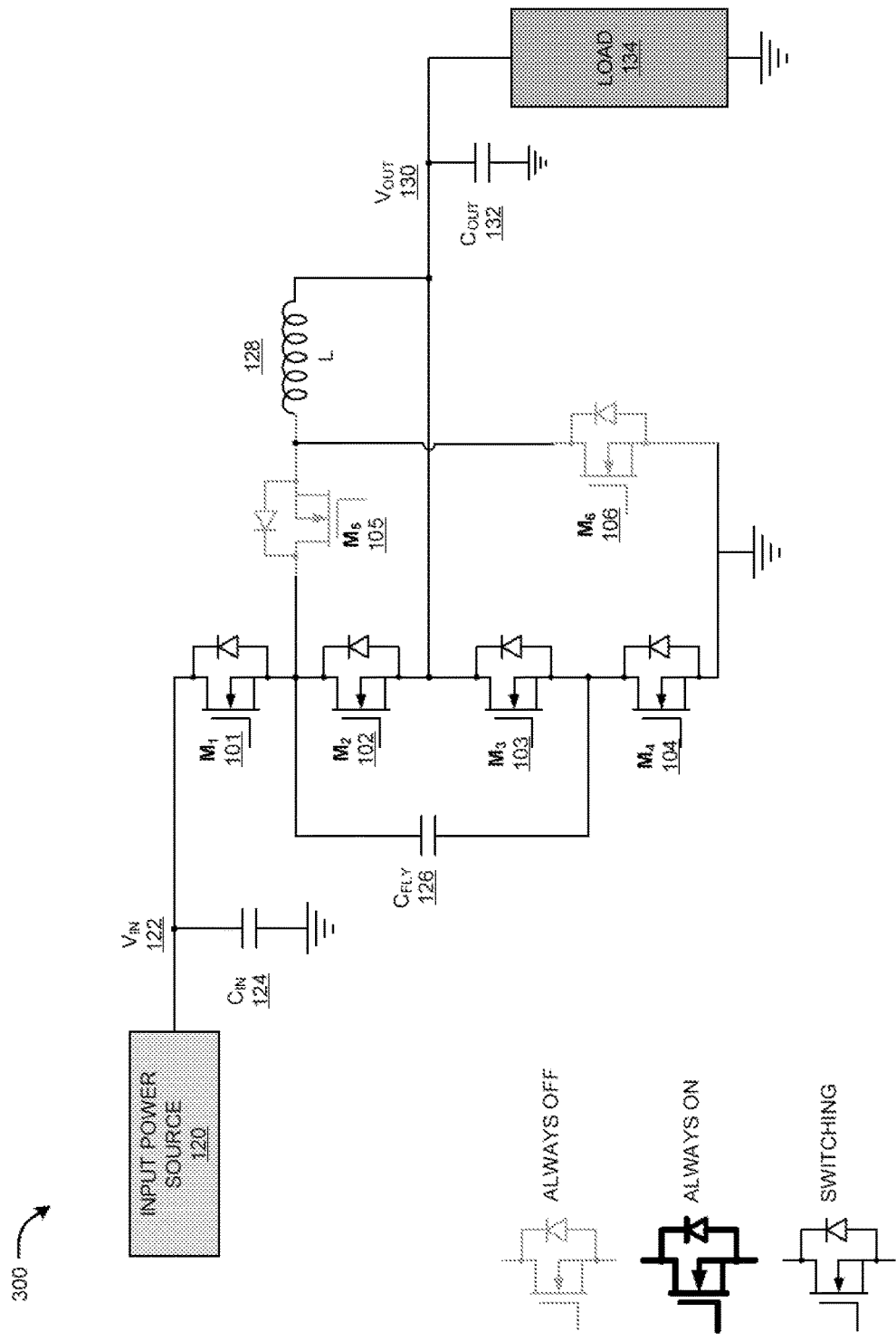
FIG. 3 illustrates an exemplary schematic diagram of the proposed hybrid power converter in 2:1 Halving Switched Capacitor (HSC) Mode, in accordance with an embodiment of the present disclosure.

FIG. 3 illustrates an exemplary schematic diagram of the proposed hybrid power converter in 2:1 Halving Switched Capacitor (HSC) Mode, in accordance with an embodiment of the present disclosure. As illustrated, the power converter in HSC mode may include the switches 101, 102, 103, and 104 to be switching between ON and OFF states across the two switching phases and switches 105 and 106 to be always off.

In an embodiment, in the 2:1 Halving Switched Capacitor (HSC) Mode for power conversion, the desired output voltage is equal to half of the input voltage level This implies $V_{OUT}=\frac{1}{2} V_{IN}$, or, in other words, a duty cycle of 50%. The HSC mode operates in open loop, that is, the duty cycle is not regulated via a feedback and may be composed of two phases, timing of each phase being equal:

Switching Phase 1 (for time duration T): The switches 101 and 103 (M1 and M3) are turned on to charge the flying capacitor $C_{FLY}$ (126) in series with the load (134). Below equations represent the state of the flying capacitor $C_{FLY}$ during switching phase 1:

$$V_{IN}-V_{FLY}=V_{OUT}$$

Switching Phase 2 (for time duration T): The switches 102 and 104 (M2 and M4) are turned on to transfer the energy stored in the flying capacitor $C_{FLY}$ (126) to the load (134). Below equations represent the state of the flying capacitor $C_{FLY}$ (126) during switching phase 2:

$$V_{FLY}-V_{OUT}=0$$

Assuming, T+T=2T, the total switching time-period of both the switching phases and substituting $V_{FLY}=V_{OUT}$ from the equation of switching phase 2 to the equation of switching phase 1, $$V_{IN}-V_{OUT}=V_{OUT}$$

$$V_{OUT}=V_{IN}/2$$

Figure 4:
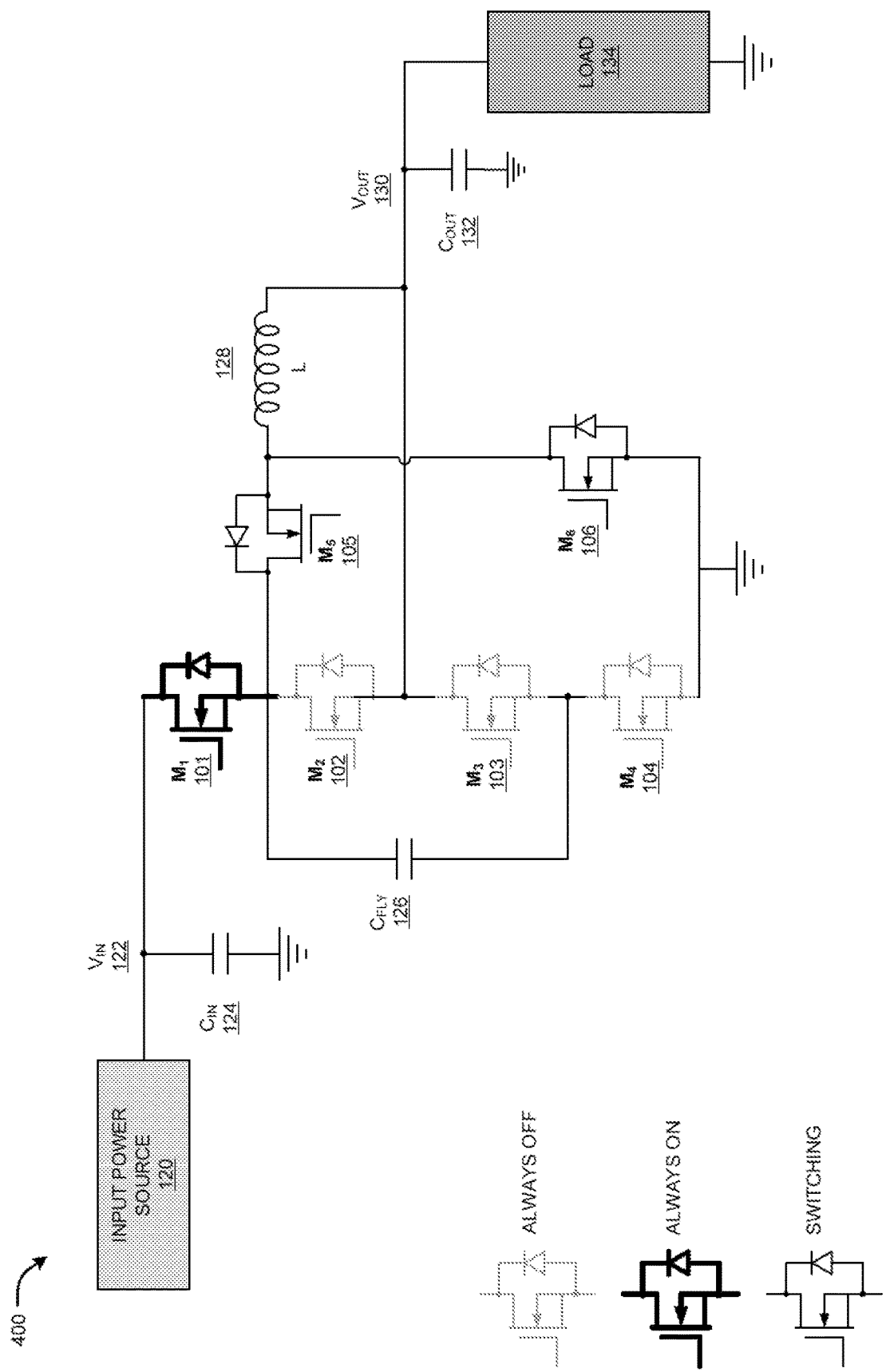
FIG. 4 illustrates an exemplary schematic diagram of the proposed hybrid power converter in a Synchronous Buck Mode, in accordance with an embodiment of the present disclosure.

FIG. 4 illustrates an exemplary schematic diagram of the proposed hybrid power converter in Synchronous Buck Mode, in accordance with an embodiment of the present disclosure. As illustrated, the power converter in the Synchronous Buck Mode may include the switch 101 to be always on, switches 105 and 106 to be switching between ON and OFF states across the two switching phases and switches 102, 103 and 104 to be always off.

In an embodiment, a Synchronous Buck Mode may be used for power conversion where the desired output voltage is greater than half of the input voltage level. This implies $V_{OUT}>\frac{1}{2} V_{IN}$ and $V_{OUT}<V_{IN}$, or, in other words, a duty cycle greater than 50%. The Synchronous Buck mode operates in the standard two phases.

Switching Phase 1 (for time duration $T_1$): Switch 105 (M5) is turned on to charge inductor in series with output load. Below equations represent the state of the inductor L during switching phase 1:

$$V_{IN}-V_{OUT}=L\Delta I_1/T_1$$

Switching Phase 2 (for time duration $T_1$): Switch 106 (M6) is turned on to transfer the energy stored in the inductor to the load. Below equations represent the state of the inductor L during switching phase 2:

$$V_{OUT}=L\Delta I_2/T_2.$$

Assume $T_1+T_2=T$, the total switching time-period of both the switching phases. The decrease in inductor current $-\Delta I_1$ in switching phase 1 should be the same as increase in inductor current $\Delta I_2$ in switching phase 2, hence:

$$-\Delta I_1=\Delta I_2$$

$$\Rightarrow (V_{IN}-V_{OUT})\times T_1/L=(0-V_{OUT})\times T_2/L$$

$$\Rightarrow V_{OUT}=V_{IN}\times T_1/(T_1+T_2)=V_{IN}\times D$$

The switching cycles times $T_1$ and $T_2$ are adjusted to obtain the various values for the duty cycle ratio, $D=T_1/(T_1+T_2)$, hence obtaining the various levels of output voltage VOUT, as per the voltage equation above.

Figure 5:
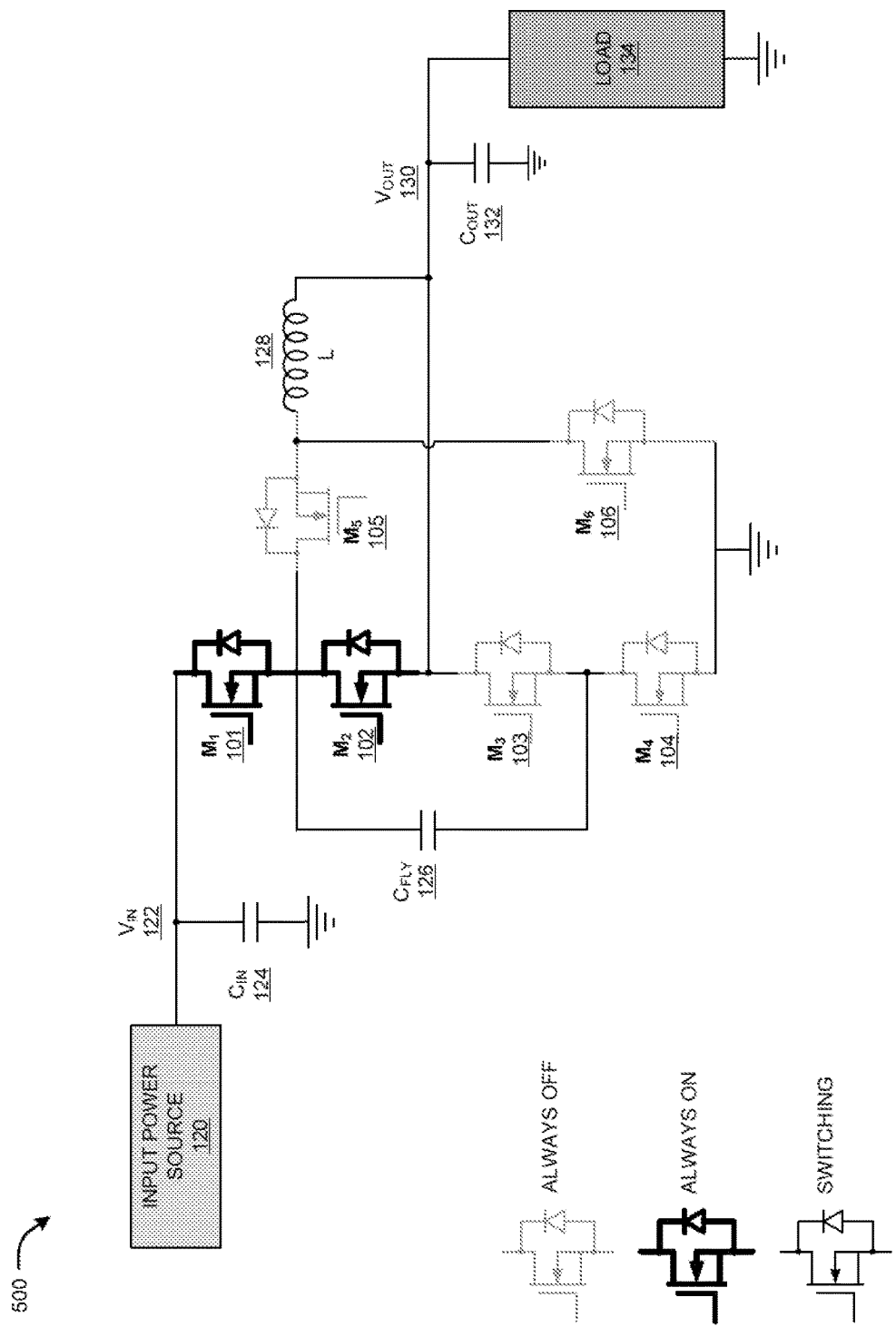
FIG. 5 illustrates an exemplary schematic diagram of the proposed hybrid power converter in a Direct Connection Mode, in accordance with an embodiment of the present disclosure.

FIG. 5 illustrates an exemplary schematic diagram of the proposed hybrid power converter in Direct connection Mode, in accordance with an embodiment of the present disclosure. As illustrated, the power converter in the Direct Connection Mode may include the switches 101 and 102 to be always on and switches 103, 104, 105 and 106 to be always off In an embodiment, the Direct Connection Mode may be used for power conversion where the desired output voltage is equal to the input voltage level. This implies $V_{OUT}=V_{IN}$, or, in other words, a duty cycle of 100%. For Direct Connection mode, the switches 101 and 102 (M1 and M2) may be turned on continuously to directly connect the output terminal to the input voltage.

The proposed DC-DC Hybrid Variable Switched Capacitor Converter (HVSC) addresses the problems faced by inductor-based and inductor-less DC-DC power converters, by providing a higher power conversion efficiency like the inductor-less switched capacitor converters, and voltage/current regulation like the inductor-based power converters in a single power conversion unit. HVSC converter uses inductor as well as flying capacitor in the switching topology, enabling a duty cycle-based output voltage/current regulation.

Compared to inductor-based converters, HVSC converter enables VSC power conversion mode with a switching scheme that does not lead to entire load current flowing through the inductor, hence providing higher efficiency. Lower switching losses also improve the efficiency compared to standard inductor-based converters. Though VSC Mode provides power conversion with duty cycles less than 50% only (output voltage less than half of input voltage), the VSC Mode is optimized to work with greater efficiency at higher input voltages for the same output voltage and higher output load current, the desired DC-DC conversion for applications such as fast battery charging. In case duty cycle more than 50% is desired, the HVSC can work as a standard inductor-based buck converter as well.

Compared to inductor-less switched capacitor converters, HVSC converter provides a very small drop in efficiency, by adding the voltage/current regulation feature which is not feasible with open-loop switched capacitor converters. In addition, the HVSC converter topology also supports the open-loop standard 2:1 switched capacitor converter, thus not losing behind the high 2:1 direct conversion efficiency of switched capacitor conversion.

Compared to multiple power converters present as standalone units in present day portable device systems, HVSC converter provides a single power conversion unit, while enabling the desired higher efficiency and voltage/current regulation features. Thus, the HVSC converter reduces the overall cost and PCB footprint of the power conversion system.

Compatibility to all varieties of input supplies, HVSC power conversion can be targeted for a varieties of input supplies, including the latest power supplies available for fast charging technologies. HVSC supports various power conversion modes, any one of which can be selected based on the type of input supply. For example, consider the case of charging a 1s battery in a smartphone from a power adapter that may support USB Power Delivery charging protocol:

| Power Adapter Type/Features | HVSC Operation Mode (For charging 1 S battery) |
|---|---|
| 5 V Legacy (Type-C/Type-A) | Synchronous Buck |
| USB Power Delivery (5 V/9 V Fixed Supplies) | Synchronous Buck |
| USB Power Delivery (15 V/20 V Fixed Supplies) | Variable Switched Capacitor |
| USB Power Delivery (5 V Programmable Power Supply) | Direct Connection |
| USB Power Delivery (9 V Programmable Power Supply) | 2:1 Halving Switched Capacitor |
| USB Power Delivery (20 V Programmable Power Supply) | Variable Switched Capacitor |
| USB Power Delivery (28 V Extended Power Range Fixed Supply) | Variable Switched Capacitor |

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

Advantages of the Present Disclosure

The present disclosure provides for a DC-DC Hybrid Variable Switched Capacitor Converter (HVSC) that provides a higher power conversion efficiency like the inductor-less switched capacitor converters, and voltage/current regulation like the inductor-based power converters in a single power conversion unit.

The present disclosure provides for a DC-DC HVSC converter that uses inductor as well as flying capacitor in the switching topology, enabling a duty cycle-based output voltage/current regulation.

The present disclosure provides for a DC-DC HVSC converter that enables power conversion with a switching scheme that does not lead to entire load current flowing through the inductor, hence providing higher efficiency.

The present disclosure provides for a DC-DC HVSC converter that enables lower switching losses to improve the efficiency compared to standard inductor-based converters.

The present disclosure provides for a DC-DC HVSC converter HVSC converter that is optimized to work with greater efficiency at higher input voltages for the same output voltage and higher output load current, the desired DC-DC conversion for applications such as fast battery charging. In case duty cycle more than 50% is desired, the HVSC can work as a standard inductor-based buck converter as well.

The present disclosure provides for a DC-DC HVSC converter that contributes a very small drop in efficiency, by adding the voltage/current regulation feature which is not feasible with open-loop switched capacitor converters.

The present disclosure provides for a DC-DC HVSC converter that supports the open-loop standard 2:1 switched capacitor converter, thus not losing behind the high 2:1 direct conversion efficiency of switched capacitor conversion.

The present disclosure provides for a DC-DC HVSC converter that can present as standalone units in present day portable device systems, HVSC converter provides a single power conversion unit, while enabling the desired higher efficiency and voltage/current regulation features.

The present disclosure provides for a DC-DC HVSC converter that reduces the overall cost and PCB footprint of the power conversion system.

We claim:

1. A hybrid variable switched capacitor DC-DC power converter, said converter comprising:
   at least one power switching network supporting a plurality of power conversion modes and characterised in that:
   an input terminal connected to an input power source and an associated input capacitor;
   an output terminal connected to a load and an associated output capacitor to obtain a desired output voltage or output load current regulation;
   at least six switches;
   at least one inductor; and
   one or more flying capacitor;
   wherein the plurality of power conversion modes includes a Variable Switched Capacitor (VSC) Mode, 2:1 Halving Switched Capacitor (HSC) Mode, a Synchronous Buck Mode, and a Direct Connection Mode, wherein the converter is operated in any of a switching or non-switching mode to obtain a set of step-down power conversion schemes,
   wherein each power conversion scheme is selected for a predefined range of step-down ratios to maximize efficiency of power conversion, and
   wherein each power conversion scheme is selected at a time based on a load type and input power source type.

2. The converter as claimed in claim 1, wherein the at least one power switching network comprises:
   a first switch, a second switch, a third switch and a fourth switch of the at least six switches, wherein the first switch, the second switch, the third switch and the fourth switch are connected in series between the input terminal and ground;
   a fifth switch of the at least six switches configured in the at least one power switching network such that a first terminal of the fifth switch is connected to a shared node of the first switch and the second switch and a second terminal of the fifth switch is connected to a sixth switch of the at least six switches;
   the sixth switch is configured such that a first terminal of the sixth switch is connected to the fifth switch and a second terminal of the sixth switch is connected to the ground;
   the at least one inductor connected between a shared node of the fifth switch and the sixth switch and the output terminal;
   the one or more flying capacitors connected between a shared node of the first switch and the second switch and the shared node of the third switch and fourth switch.

3. The converter as claimed in claim 1, wherein a first power switching network of the at least one power switching network for enabling the VSC Mode for power conversion is configured for the desired output voltage that is less than half of input voltage level, wherein the VSC Mode comprises at least two switching phases, and total time of the two switching phases equal to switching time-period.

4. The converter as claimed in claim 3, wherein the at least two switching phases comprises a first switching phase for a first predefined first time duration, wherein the first switch and the third switch of the first power switching network are turned on to charge the one or more flying capacitor in series with the output load from the input power source and wherein, the sixth switch of the first power switching network is turned on to allow the at least one inductor to transfer the stored energy to the load.

5. The converter as claimed in claim 4, wherein the at least two switching phases comprises a second switching phase for a second predefined second time duration, wherein the fourth and the fifth switches of the first power switching network are turned on to transfer the energy stored in the one or more flying capacitor in the first switching phase to be transferred to the at least one inductor and the load,
   wherein a small dead time is introduced between the two switching phases between turning off a set of switches and turning on of another set of switches,
   wherein the second switch is turned off for an entire operation,
   and wherein a ratio of the desired output voltage to the input voltage level can be represented as a ratio of a second switching phase time to a sum of total switching time and the second switching phase time.

6. The converter as claimed in claim 2, wherein a first power switching network of the at least one power switching network for enabling the 2:1 HSC Mode for power conversion is configured for the desired output voltage to be equal to half of input voltage level and an output current is approximately double of an input current,
   wherein, in a first switching phase for a predefined first time duration, the first and the third switches are turned on to charge the one or more flying capacitor in series with output load,
   wherein, in a second switching phase for a predefined second time duration, the second and the fourth switches are turned on to transfer energy stored in the one or more flying capacitor to the load,
   and wherein the fifth and the sixth switches are turned off for an entire operation.

7. The converter as claimed in claim 2, wherein a first power switching network of the at least one power switching network for enabling the Synchronous Buck Mode for power conversion is configured for a desired output voltage that is greater than half of input voltage level,
   wherein the first switch is turned on for an entire operation,
   wherein, in a first switching phase for a predefined first time duration, the fifth switch is turned on to charge the at least one inductor in series with output load,
   wherein, in a second switching phase for a predefined second time duration, the sixth switch is turned on to transfer energy stored in the at least one inductor to the load,
   and wherein the second, the third and the fourth switches are turned off for the entire operation.

8. The converter as claimed in claim 3, wherein a second power switching network of the at least one power switching network for enabling the Direct Connection Mode for power conversion is configured for a desired output voltage that is equal to the input voltage level, wherein an output current is equal to an input current,
   wherein the first and the second switches are turned on for an entire operation to directly connect the input power source to the load, and wherein the third, the fourth, the fifth and the sixth switches are turned off for the entire operation.

9. A method of operation of the converter as claimed in claim 1, said method working in the Variable Switched Capacitor mode, said method comprising:

operating the converter in at least two switching phases,
wherein total time of the at least two switching phases equal to a switching time-period,
wherein, in a first switching phase, the first and the third switches are turned on to charge the one or more flying capacitor in series with the output load from the input power source and the sixth switch is turned on to allow the at least one inductor to transfer a stored energy in the at least one inductor to the load,
wherein, in a second switching phase, the fourth and the fifth switches are turned on to transfer a stored energy in the one or more flying capacitor to the at least one inductor and the load,
wherein a small dead time is introduced between the at least two switching phases between turning off a first set of switches and turning on of a second set of switches,
wherein the second switch is turned off for an entire operation, and
wherein a ratio of the desired output voltage to an input voltage is represented as a ratio of a second switching phase time to a sum of total switching time and the second switching phase time.

10. The method as claimed in claim 9, said method working in the Direct Connection mode, said method comprising:
turning on the first and the second switches for the entire operation to directly connect the input power source to the load; and
turning off the third, the fourth, the fifth and the sixth switches for the entire operation, wherein the desired output voltage is same as the input voltage.

* * * * *